May 10, 1949. D. K. WARNER 2,469,619
AIRCRAFT WHOSE LIFT IS INCREASED BY POWER MEANS
Filed Nov. 17, 1943 3 Sheets-Sheet 1

Inventor
Douglas K. Warner

May 10, 1949.  D. K. WARNER  2,469,619
AIRCRAFT WHOSE LIFT IS INCREASED BY POWER MEANS
Filed Nov. 17, 1943  3 Sheets-Sheet 2

Inventor
Douglas K. Warner

May 10, 1949. D. K. WARNER 2,469,619
AIRCRAFT WHOSE LIFT IS INCREASED BY POWER MEANS
Filed Nov. 17, 1943 3 Sheets-Sheet 3

Inventor
D.K. Warner

Patented May 10, 1949

2,469,619

UNITED STATES PATENT OFFICE 2,469,619

AIRCRAFT WHOSE LIFT IS INCREASED BY POWER MEANS

Douglas K. Warner, Sarasota, Fla.

Application November 17, 1943, Serial No. 510,843

13 Claims. (Cl. 244—15)

This invention relates to aircraft, more particularly to that type whose lift is greatly increased by power means for increasing the air velocity above a wing. The primary object of this invention is to increase the propulsion efficiency at low speed of a plane employing such lift as described in my U. S. patents numbered 2,364,646, 2,364,677, 2,390,859, 2,387,627, 2,418,380, and 2,410,471.

Other objects of the invention are to hold motors and propellers above a wing in a manner to afford little air resistance, to leave the top surface of the wing, wherever the air speed is high, free from obstruction, to so combine the wing and fin surface of the plane as to form a surface wrapped part way around the lower part of each propulsion propeller so that the maximum air velocity which is naturally present at the tips of said propellers may be increased and spread out over an extended wing and stabilizing surface thereby to decrease the necessary size of the plane wing and its stabilizing surfaces, to increase the loads carried and to decrease the power required for such loads. Further objects are to utilize the revolving motion of a propeller slip stream to increase the plane's lift and decrease its drag by means of the wing required to hold the motors operating the propellers, and to utilize the oscillating effect of the air stream behind a propeller of two or few blades, to produce Katzmayr effect and a negative drag over the motor supporting wing as well as a lift and to automatically keep a plane which is subject to such enormous power lifts, stable, dynamically, in the event that power fails and these added lifts are largely lost. Especially this is so if, as in the case of the compression plane these lifts have intentionally been made rearward of the center of gravity to offset a forward movement of the center of pressure when the plane is changing from skimming to high altitude flight. A further object is to so modify the upper wing of a biplane structure that it may be strong enough to support propulsion motors in its tips and still not appreciably reduce the lift of the main wing below, while still supporting a considerable load itself, and to prevent the early stall otherwise present in the top member only of all other biplanes. A further object is to set up an original tensile stress in the upper wing central portion of the biplane structure which upon airloading would normally have a compression stress and thereby permit the use at its central portion of a small light weight, thin airfoil in the place of the large, fat heavy one otherwise required for a large compression load. A large top wing spoils lift of wing below where a propeller is not interposed to sweep top surface of lower wing. A further object is the locating of the ailerons in such a position that they may also act as elevators and so that they need only be a small fraction of the usual size and so that they may also greatly increase the maneuverability, and a final object is the attainment of a new type of lift caused by skimming low over waves to get by Katzmayr effect a negative drag from the oscillating air movement over waves and a lift from directing the air escaping laterally in a downward direction under wing tip runners.

My invention consists primarily of a wing having end plates at its tips and connected with said tips by wing surface bent to a radius of the approximate sweep of the blade of a propeller held above said junction, and of means for supporting said propeller and its motor by mounting these in the tips of a wing above, and by tying said motors by a tiny strut (maintained in tension) to the center of the arc of the wing below and by taking the weight of the wing, motors and original tensile stress in a compressive strain on short, fat streamlined struts which engage with the fuselage of the plane at a location where the air velocity is much lower than at all other points on the top surface of the plane, said struts spreading out diagonally so that their bases are much farther apart, longitudinally, than the maximum chord of the wing above and so that their tops laterally are farther apart than at their junction with the plane so that a high tensile stress may be set up in the central portion of the wing between the top portions of these struts said tensile stress being increased by the weight of the motors and by the tension originally set up in the struts tying the motors to the lower wings, thus changing the normal compression load in this central portion of the top wing to continuous tension thus permitting its chord to be cut in half and split up to afford an auxiliary airfoil which will react less on the wing below and which will maintain the lift at the rear portion of the wing's central portion at much higher angles of attack than would otherwise be possible, and also permitting the thickness of this central wing portion to be so reduced that it can be formed merely of a continuation of the top plywood surface in the wing stubs supporting the wing tip motors. These wing stubs are designed to be only in the path of the upward moving side of the propeller, they are higher than the centerline of the propeller shaft have both edges deflected downward towards the motors in their tips, and they have heavy struts at the inner edges and have an attack angle less than the thicker wing below so that air impinged on the lower surface of this top airfoil by the upward moving propeller blades finds itself literally in a diffusion nozzle in which velocity energy is converted into pressure and into forward thrust or propulsive power. The central portion of this upper wing on the other hand being composed of a continuation of only the top surface of the rear portion of the stub wings has a higher attack angle but it is so far back, so high, and so short a chord that it does not effect the air velocity over the wing below which is maintained very high by many propulsion jets spread in series down the upper surface of the pressurized fuselage, and for a short distance out over the rear lateral wings, to a location where the blast from the propellers may take the place of the blast from within the plane.

All the forementioned factors and others that may hereafter be described combine to increase the lift at low velocities, decrease the drag and increase the propulsive thrust and shall hereafter be fully described and specifically pointed out in the claims. In the accompanying drawings forming part of this specification, in which like reference numbers indicate similar parts in all figures:

It is to be understood that while it is essential that the front float stabilizer must have an exact relationship to the rear wing depending on the size and distance removed thereof, that this drawing depicts no more than an approximate relationship of that comparative size and the respective attack angles of each which of course can be determined only by wind tunnel test. In one test it has been demonstrated that merely increasing the polish on these floats materially affects the stability of the plane permitting plane to pass its top stability angle of 40 degrees and climb steeper until stalled.

Figure 1:
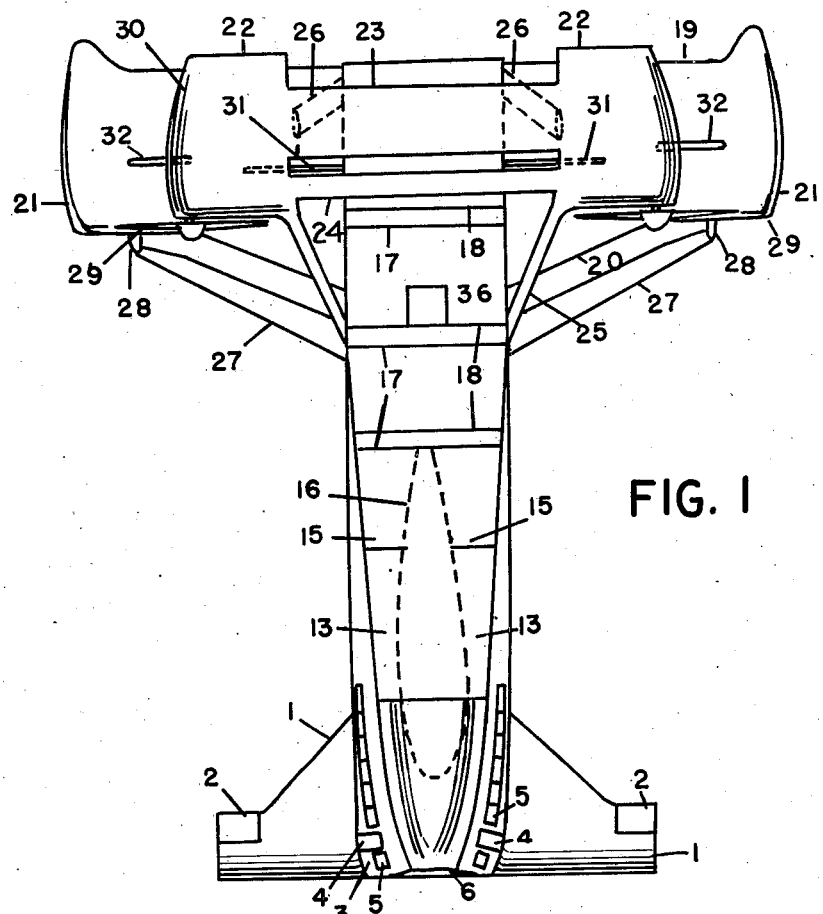
Fig. 1 is a top or plan view of a slow speed compression plane embodying this additional invention of propellers mounted in the tips of an upper wing and turning in an arc formed by the curved junction of the rear wing tips and their end plate stabilizer fins.
Figure 2:
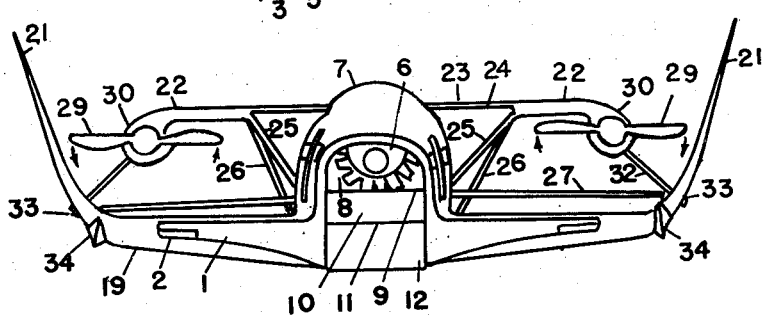
Fig. 2 is a front elevation of the plane.
Figure 3:
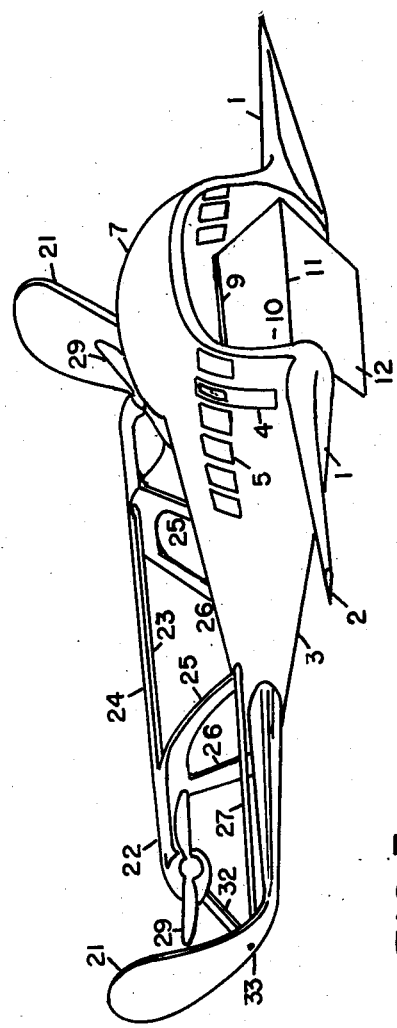
Fig. 3 is a front diagonal view, Fig. 4 a rear diagonal view.

As seen in top view Fig. 1 and front elevation Fig. 2, 1 represents the forward floats or stabilizers and 2 the separately moving elevators or ailerons by the motion of one or both of which the plane can be made to climb or dive or bank and turn with a cooperative and intense effect strikingly opposed to the effect of operation of the normal controls on a plane. The reason for the greatly increased power of a given surface in these ailerons is that this surface is many times further away from the center of gravity and because the air it contacts has not been disturbed by the large main wing and perhaps just because it is out ahead which may be another way of saying for reasons unknown in addition.

No. 3 represents the fuselage cabins, one each side of the central air inlet passage 6. These cabins are provided with doors 4 entering from the top of float airfoils 1 and with windows 5 giving vision directly to the side and front or thru the air passage and windows of the opposite cabin or thru the wide air entrance 6. No. 7 is the dome of a streamlined covering above the air entrance and the compression fan 8 while 9 is the leading edge of an airfoil connecting the two cabins and hollowed to encase the bottom of fan 8 in its middle section. At 9 is the upper hinge for a light flap 10 while 11 is a lower hinge of upper flap 10 to which lower flap 12 is attached. 13 is a diffusion air passage within the body of the plane at either side of the motor cabin 16. In this passage air taken from each side of the fan is slowed down and compressed thereby while above the motor cabin, air is exhausted directly out and backwards over the plane at 14 directly back of the upper portion of fan 8 and as shown in the former patent applications mentioned and not therefore detailed here, air from the bottom of the fan passes out thru a diffusion passage formed by the bottom of the body and the top of the airfoil 9 connecting the two cabins.

Compressed air leaving this lower diffusion passage spreads out in a large cavern under the plane between its two side portions containing cabins 3, moves back to where the tail tip of the central part of the plane contacts a surface and also moves forward under airfoil 9 blowing flaps 10 ahead to a fixed stop and blowing flap 12 ahead so that its rear lower edge will always just contact the top of any wave without disturbing said wave and so preventing air from leaking forward.

Slots 15 are cut in the roof of passages 13 to renew and increase the air velocity originally built up over dome 7 by the forward motion of the plane and then enormously intensified by fan outlet 14. The center portion of 14 being higher than its lateral portions carries the maximum air volume so that the jet 15 need only resupply the side portions of the air stream over the plane. 17 and 18 are respectively the leading and trailing edge slots produced by turning small airfoils in the roof of the plane said airfoils being pivoted in sides of plane and operated by the pilot as described and shown in former applications. This controls the attack angle of the plane if ailerons 2 were shot away. No. 19 is the trailing edge of the main wing, and 20 is its leading edge while 21 is the end plate or tail fin which extends well behind trailing edge 19 and well above the highest point reached by propeller blades 29 which turn in close proximity to the curved leading edge joining the tip of 20 with 21. 22 is the stub wing tips of the upper wing which house the propeller motors 30; 23 the main central portion of the upper wing and 24 its auxiliary airfoil and 25 are the front struts which at their lower extremity are attached to the upper corners of the fuselage far ahead of the upper wing's leading edge while rear struts 26 extend from the wing stubs to lower central portion to the rearmost extremity of the fuselage thus bracing the wing without any need for guy wires which ordinarily are used and which vibrate and drag thru the air. Pilot wings 27 at their outer extremity are pivoted at bracket 28 the leading point of air deflectors 34 and at their inner ends are turned by pipe 46 passing thru the wall of the plane to control. As before mentioned 29 are the outside propellers and 30 their engine nacelle which is blended into the stub wing at the rear and provides a downwardly inclined wing tip of the heavy thick portion of the top wing. This stub wing also has another downward bend at the contact with struts 25 and 26. The bottom of this airfoil 22 slopes slightly upwards towards its trailing edge while the top of the wing below which normally flies at a 6 deg. attack angle has a downward slope varying from 10 to 15 degrees growing steeper at the tail and also as the wing gets thicker nearer to the fuselage. While air can move between the struts or under the nacelle the restriction of lateral air movement under nacelle and upper braces between struts is too great to prevent the upper part of the space under the upper wing from diffusing the air to a high pressure beneath said upper wing portion which pressure both lifts the wing and shoves it forward. The blast from the propeller down and around wing tips and from the pressure slots 31 on the top of the lower wing, together with the open unobstructed sweep over all its surface (unlike the inverted trough above) prevents that pressure formed above from acting downwards on the lower wing. Thru the center of strut 32 a bolt extends from the engine thru the wing at the center of its curved portion to nut 33 which may be tightened to pull the two wings together to the desired tension or to the spacing provided by the light streamlined housing around said bolt. In considering the value of this imposed tension strain on the wing it should be noted that the plywood covering of the wings is approximately 3 times stronger in tension than in compression of short pieces and some ten times stronger than compression in a wing the length and thickness of the central portion of the top wing. The preloading puts an original compression load in the top surface of the thick and rapidly tapered lower main wing but this surface is made heavy to stand the flight compression load and the strains it must be subjected to when walked upon or when tanks are driven upon it on the way to or from 36 the loading hatch or elevator ramp combination leading down inside the fuselage.

However as there is no need for a large aircraft carrier to change quickly from skimming to high flight at slow speed it is not intended to use the present invention for such very large planes, and these would be flown as formerly described by pure jet propulsion from thousands of tiny high speed engines located directly in front of all top slots or bottom diffuser openings inside the plane.

Figure 4:
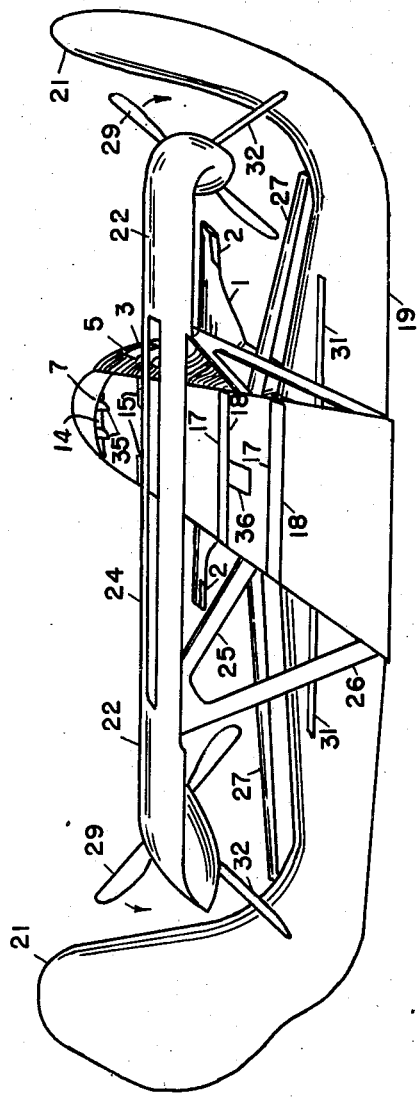

No. 34 represents the wing tip runners or bottom air deflectors. Air rushing out laterally below the wing is deflected downward by the sweep of this runner in a manner to obtain a lift reaction from said air. The forward point of this runner 28 supports the outboard turning pin of the automatic pilot wings 27. On Fig. 4 the rear top opening from the pressure fan is shown below the nose dome 7. In this opening are located the stationary reversing blades 35 which straighten the swirling path of air leaving the pressure fan and restore the energy normally lost in the swirling slip stream of a propeller. Similar blades are of course located in the diffuser passages 13 inside the body and in the diffuser below the plane.

We should next turn our attention to the matter of stability in such a heavily loaded plane. The size of load may be indicated by the fact that a single stage pressure fan can develop a lift of 2,000 lbs. per sq. ft. beneath the plane plus 1000 lbs. per square ft. above the plane. Also most of the pressure lift is lost if the plane takes off away from skimming at slow speed. Since in starting the pressure lift is the chief lift and since its center is about 57% of plane from leading edge this fuselage center of pressure must also be the center of pressure of the plane in flight. This is brought about by reduction of pressure above the wings at rear while the C. P. of the fuselage moves forward during takeoff from a surface. Also the body and front wings as claimed in former applications must have a higher attack angle than the rear wings so that as the angle of attack increases the proportional increase of lift shall be greater in the rear wing than in the other two portions of the plane. The front wings must be large enough to float the front of the plane and small enough to keep the C. P. back at 57%. To accomplish both conflicting aims they must be very thick and of very low aspect ratio resulting in a delayed stall point of some 40 degree attack angle. However it is essential that for stability the stall point of the rear wing be later still as otherwise a point would be reached at which the rear wing lift would not be increasing faster than that lift produced by the body and the front wing. A pilot wing will delay the stall point of the rear wing but in order to delay it the required amount it is essential that the pilot wing automatically change its position with respect to the rear wing as the latter changes its attack angle. The most efficient positions for all attack angles of the main wing seems to be when the pilot wing is maintained at approximately 3 degrees as compared with the ground irrespective of the wing angle. This angle will of course vary according to the amount of camber used in the pilot wing or whether or not propulsion slots are used above the pilot wing as in the plane. The pilot wings may be held in this relationship to the ground by gyroscope or gravity. Each has its disadvantages. The gyroscope is expensive, subject to wear and failure of its parts or to failure of its power source, and as this plane is designed for non stop flights of ¼ the earth's hemisphere at the end of the flight the gyroscope might be holding the pilot wings 90 degrees out of position if uncorrected before the end of the flight.

On the other hand gravity has the very serious failure that weight is effected by inertia of that weight as well as by gravity, and if the plane slows down as it will when it goes into a steep attack angle the weight will move forward with as much or more force than it pulls down thus entirely defeating its purpose in holding the control lever of the pilot wing 27 straight down.

The automatic pilot wing combined with the pressure slots and the propellers fitting in the arced wing tips practically ends the danger of stall in a plane because now the front float wings will always stall first and having stalled the pilot can not even in ignorance or sleep force the plane any higher with the ailerons for they also are now stalled and lift more if turned in opposite or negative angle. If the flap under the central portion of the leading edge is pushed out ahead it will create a strong downward pull at the leading edge of plane below its center of gravity and furnish air pressure to renew the lift of the slots in the rear wing and thus bring the plane back down to a gliding angle at which it may again be readily controlled by the front wing ailerons. As explained in earlier applications this flap is forced out to restore balance by an emergency charge of $CO_2$. As also previously explained while the pilot wing is capable of increasing the lift of the ordinary wing some 50%, chiefly by retarding the stall point, in combination with the compression plane it has a distinct new value not only in making the high lift compression plane with its top lift features as described stable, but also in increasing the efficiency and lift of the plane while skimming. With the tail of the main wing just skimming the surface no air can escape downward and the runner 34 retards air movement sideways so that its only other path is upwards which it can take by first reacting on the water out ahead of the wing. Having obtained this greatly enhanced upward motion from air reaction on the water, the pilot wing converts this large additional energy into propulsion and lift for itself, and to very high velocity and lift over the wing behind, and this action is still further magnified in traveling over waves against the wind due to the oscillating movement of the air up and down over the waves which tends to produce a negative drag on the main wing as well as on the pilot wing. It will be noted that to this high lift plane described in earlier patent applications I have added new lifts and stabilities at the curved junction of wing tip and fin which are especially effective at slow speed and that the propellers effecting this new lift are much more efficient than the slot propulsion at slow speed. It is also true that this machine created blast over the wing makes the plane travel so straight and true thru stormy weather at low altitude that the ban of low altitude seasickness is gone forever and people may have the joy of seeing the landscape without the punishment of roughriding and the planes may take advantage of the enormous increase in efficiency afforded by just missing the wavetops without fear that the plane will be knocked out of control. Also the new added lift at the wing tips permits (with compression take off), efficient flight at low altitude at speeds only slightly in excess of takeoff speed, therefore not requiring climb to the stratosphere in order to make flight efficiency better as is necessary in those planes which must takeoff from landing fields whose lengths do not permit attaining half the flying speed. This will correct the mistaken idea prevalent that planes fly high to gain efficiency whereas in reality high flight is an inefficient means of partially correcting the great inefficiency resulting from too slow a takeoff speed. This new efficiency, combined with a plane that can land most anywhere safely, now permits people to make enjoyable and economical flights without fear of the ever present nose-over death lurking in the plane with wheels. High velocity air drag is now only present where it is useful as lift and none of the required protuberances need be in its path. The parasite drags along with that of the undersurface of the wing may be almost completely eliminated. The new type lift described herein need not be limited to the compression plane on which it is shown but may be applied with almost equal efficiency to any other type of plane having wings with nearly vertical fins at their tips.

Having thus described my invention what I claim as new and desire to secure by Letters Patent is:

1. In an airplane having oppositely positioned propellers mounted each side of and above the fuselage thereof, a laterally projecting wing positioned immediately below the propeller sweeps, said wing having intermediate portions curved adjacent and conforming to said propeller sweeps, and substantially vertical upwardly directed extremities forming in combination therewith duplicate tail fin surface extended to full height of propellers.

2. In an airplane having oppositely positioned propellers mounted above and outside of the fuselage thereof, a laterally projecting wing positioned immediately below the propeller sweeps, said wing having intermediate transition portions curved adjacent and conforming to the outer lower approximate 80° sweep of said propellers and upwardly inclined extremities of greater width than said wing and projecting behind the trailing edge thereof and forming tail fins and end plates in combination with said wing's curved portion.

3. In an airplane having a fuselage, a wing extending over said fuselage, propellers mounted at the extremities of said wing, and a second wing projecting from said fuselage beneath said propellers and said first mentioned wing, said second wing having upstanding wing end plate tail fins curved around and adjacent the slipstreams from said propellers and said end plate fins extended upwardly above the level of said first mentioned wing.

4. In an airplane having a fuselage, a wing extending laterally thereover and located at the extreme rear of said airplane, propellers mounted in the extremities of said wing, and a second wing projecting from said fuselage beneath the first mentioned wing, the second wing having upstanding extremities adjacent the slipstreams from said propellers and intermediate portions adjacent and conforming to the sweeps of said propellers said upstanding extremities and curved wing portions forming in combination duplicate tail fins and wing end plates.

5. In an airplane having a fuselage, a main wing projecting from said fuselage and having upturned extremities forming tail fins, and intermediate transition portion of gradual curvature of about 80°, pilot wings in advance of said wing extending from said fuselage to the transition portions of said main wing and means maintaining said pilot wings in constant angular relationship with the ground irrespective of the attack angle of said main wing.

6. In an airplane having a fuselage, a wing projecting from said fuselage and having nearly vertical fins at its extremities blended into said wing in a gradual curve, runner like projections on the under surface of the curved portions thereof, said projections having concave inner faces whereby air moving laterally under said wing is deflected downwardly.

7. In an airplane having a fuselage, a wing extending laterally over said fuselage, propellers mounted at the extremities of said wing, and a second wing projecting from said fuselage beneath said first mentioned wing, upwardly, outwardly inclined supports from said fuselage to said first mentioned wing, the central portion of said wing being approximately half the chord of the end portions of said wing, said end portions being in the slip-stream of said propellers.

8. In an airplane having a fuselage and propulsion means, a wing projecting from said fuselage, and a second wing above said first wing, the chord of said second wing at the wing midsection being no more than half that of its end portions and an auxiliary airfoil positioned to precede said upper wing's mid-section at slightly higher level.

9. In an airplane as in claim 8, an auxiliary airfoil ahead of and above said upper wing's narrow midsection, both said auxiliary airfoil and said wing midsection being comprised of a continuation of the said top material of the end sections and the attack angle of the auxiliary airfoil being less than, and that of the main midsection being more than, that of the end sections.

10. In an airplane, a fuselage, a wing projecting from said fuselage, a second and shorter wing above said first wing, said second wing having motors in the outer extremities of said second, upper, shorter wing and propellers mounted forwardly thereof, a pair of struts extending upwardly, outwardly from each side of said fuselage to said upper wing, webs projecting below said upper wing and connecting the top portion of each pair of struts, said webs, said wing tips, and the under side of said upper wing defining an inverted trough of rearwardly increasing cross-sectional area.

11. In an airplane, a fuselage, an upcurved tip type wing projecting from said fuselage, a second and shorter wing having motors situated in the tip portion thereof, a pair of struts extending upwardly, outwardly from each side of said fuselage, said motors in said wing tips cooperating with said inclined struts thereby to set up a tensile stress in the center portion of said shorter, upper wing, and tension struts extended downwardly, outwardly from said tips to the first said wing whereby still greater tension may be originally set up in the center portion of said upper wing and whereby thin, small and divided airfoils may be used in the said center portion and whereby the propellers may be held in constant relationship to the curved wing below regardless of any wind and load stress set up in said wings.

12. In an airplane, a fuselage, an upper wing having a mid section of relatively short chord and end sections of thick airfoil section and greater chord, said wing being formed of relatively rigid material forming its top surface, outwardly upwardly inclined members supporting said wing from said fuselage and a main wing below said upper wing, the mid section of said upper wing being of relatively thin formation and being comprised only of the continuation of the same rigid material of the top surface of the end portions of said wing.

13. In an airplane, a fuselage and a main rear wing extending laterally each side of said fuselage's rear portion, a second wing situated above said first mentioned wing and rearward of the forward portion of said first mentioned wing, engines mounted in the tips of said second wing and propellers mounted ahead of said engines, at such height that the blade tips of said propellers just clear the uppermost top surface of said lower main wing, and extensions on said main wing curving upwardly around approximately ¼ the path of the outermost parts of said propellers and thence extended upwardly to a height above that of said upper second wing forming, thereby, yaw stabilizers over which the propeller blasts give yaw stability at low plane speeds as well as lift over the lower portions of said curved structure and said laterally extended lower wing.

DOUGLAS K. WARNER.

REFERENCES CITED

The following references are of record in the file of this patent:

UNITED STATES PATENTS

| Number | Name | Date |
|---|---|---|
| D. 130,650 | Silverstein | Dec. 2, 1941 |
| 1,045,209 | Starr | Nov. 26, 1912 |
| 1,060,273 | Melott | Apr. 29, 1913 |
| 1,085,932 | Nissen | Feb. 3, 1914 |
| 1,200,512 | Matta | Oct. 10, 1916 |
| 1,353,544 | Sperry | Sept. 21, 1920 |
| 1,479,901 | Dornier | Jan. 8, 1924 |
| 1,855,652 | Sanders | Apr. 26, 1932 |
| 1,876,096 | Tebbs | Sept. 6, 1932 |
| 2,081,436 | Martin | May 25, 1937 |
| 2,194,596 | Henter | Mar. 26, 1940 |
| 2,271,226 | Johnson | Jan. 27, 1942 |

FOREIGN PATENTS

| Number | Country | Date |
|---|---|---|
| 338,043 | Great Britain | Nov. 13, 1930 |
| 398,069 | Great Britain | Sept. 7, 1933 |
| 424,373 | France | Mar. 13, 1911 |